US012191542B2

(12) United States Patent
Ginter et al.

(10) Patent No.: US 12,191,542 B2
(45) Date of Patent: Jan. 7, 2025

(54) CONTROLLING PEMFC STACK FLOODING

(71) Applicant: Caterpillar Inc., Peoria, IL (US)

(72) Inventors: David Ginter, Peoria, IL (US); David T. Montgomery, Edelstein, IL (US)

(73) Assignee: Caterpillar Inc., Peoria, IL (US)

( * ) Notice: Subject to any disclaimer, the term of this patent is extended or adjusted under 35 U.S.C. 154(b) by 294 days.

(21) Appl. No.: 17/804,117

(22) Filed: May 26, 2022

(65) Prior Publication Data
US 2023/0387433 A1    Nov. 30, 2023

(51) Int. Cl.
| | |
|---|---|
| *H01M 8/04* | (2016.01) |
| *H01M 8/04111* | (2016.01) |
| *H01M 8/04119* | (2016.01) |
| *H01M 8/04492* | (2016.01) |
| *H01M 8/04537* | (2016.01) |
| *H01M 8/04701* | (2016.01) |
| *H01M 8/04746* | (2016.01) |

(52) U.S. Cl.
CPC .... *H01M 8/04522* (2013.01); *H01M 8/04111* (2013.01); *H01M 8/04134* (2013.01); *H01M 8/04559* (2013.01); *H01M 8/04708* (2013.01); *H01M 8/04753* (2013.01)

(58) Field of Classification Search
CPC ...................... H01M 8/04492; H01M 8/04522
See application file for complete search history.

(56) References Cited

U.S. PATENT DOCUMENTS

| | | | | |
|---|---|---|---|---|
| 8,389,167 | B2 | 3/2013 | Frost et al. | |
| 9,768,456 | B1* | 9/2017 | Shim | H01M 8/04776 |
| 10,056,627 | B2* | 8/2018 | Bigarre | H01M 8/04582 |
| 2002/0180448 | A1* | 12/2002 | Imamura | H01M 8/0441 |
| | | | | 429/432 |
| 2017/0324101 | A1* | 11/2017 | Sinha | H01M 8/04783 |
| 2018/0166719 | A1* | 6/2018 | Kwon | H01M 8/04529 |
| 2018/0301724 | A1* | 10/2018 | Kong | H01M 8/04559 |
| 2023/0104149 | A1* | 4/2023 | Ancimer | H01M 8/04522 |
| | | | | 429/413 |

(Continued)

FOREIGN PATENT DOCUMENTS

| | | |
|---|---|---|
| CN | 109888335 B | 2/2021 |
| CN | 112599818 A | 4/2021 |
| CN | 108832157 B | 7/2021 |

(Continued)

*Primary Examiner* — Amanda C. Walke
(74) *Attorney, Agent, or Firm* — Bookoff McAndrews, PLLC

(57) ABSTRACT

A system for detecting humidity level at a cathode of a fuel cell stack including one or more PEMFCs and determining a flooding probability of the stack based on the humidity level, includes a stack including a plurality of PEMFCs, each PEMFC including an exhaust; voltage detector; humidity detector; and controller. The controller may be configured to: receive a voltage as measured at an anode of one or more of the PEMFCs with the voltage detector; determine a humidity level at the exhaust of the one or more of the PEMFCs; and implement one or more actions based on the voltage and the humidity level, the actions including: reduce a load on the PEMFC; increase an air flow at a cathode of the one or more PEMFCs; decrease an inlet humidity at an inlet to the one or more PEMFCs; or increase a temperature of the one or more PEMFCs.

20 Claims, 4 Drawing Sheets

(56) References Cited

U.S. PATENT DOCUMENTS

2023/0223570 A1* 7/2023 Shin ................ H01M 8/04335
429/432

FOREIGN PATENT DOCUMENTS

| CN | 114430056 | A | * | 5/2022 |
| CN | 116742053 | A | * | 9/2023 |
| DE | 102009026917 | A1 | | 12/2010 |

* cited by examiner

CONTROLLING PEMFC STACK FLOODING

TECHNICAL FIELD

The present disclosure relates generally to control systems for operating proton exchange membrane fuel cell stacks, and more particularly, to control systems for controlling the relative humidity at an exhaust of a proton exchange membrane fuel cell.

BACKGROUND

Proton Exchange Membrane Fuel Cells (PEMFC) utilize a proton exchange membrane (PEM) within a membrane electrode assembly (MEA) to conduct protons from an anode of a fuel cell to a cathode. Generally, PEMFCs include electrodes, an electrolyte, a catalyst, and gas diffusion layers. Cell reactions may occur at a boundary where the electrolyte, catalyst, and reactants (e.g., hydrogen and oxygen) mix (a "triple-phase boundary").

Water management may be important in PEMFC operations. PEMs may only function efficiently if an adequate amount of water is retained in the membrane to ionize acid groups in the PEM and proton conductivity may only be maximized if the membrane is properly equilibrated with water. However, too much water can result in excess condensation, inhibiting mass transfer to the electrodes and reducing cell performance. The power output of a stack of PEMFCs can thus be affected if it is dried out or if it is flooded. Relative humidity can be an indicator of either condition. In particular, relative humidity at the PEMFC cathode, where hydrogen and oxygen molecules recombine to form water, can be a critical indicator of cell performance for multiple reasons.

At high current densities, transferring oxygen to reaction sites at the cathode can be restricted because of factors such as gas diffusion layer/cathode layer (GDL/CL) flooding, the difference in diffusion rates in either direction across the MEA due to electro-osmotic drag, and flow channel blockage leading to the difficulty of removing water from the cathode. Each of these factors is exacerbated at high relative humidities at the cathode. Because cathode performance is critical to and reflective of overall fuel cell performance, determining and controlling the relative humidity at the cathode is critical.

U.S. Pat. No. 10,056,627, patented on Aug. 21, 2018, discloses a method for controlling the functioning of the fuel cell comprising at least one membrane in which the voltage values are communicated to the operator such that the operator can take different actions to control or stop the flooding of the cell and further the control can be automated by implementing a feedback loop. However, this reference does not consider using a number of different sensors at a cathode exhaust including, for example, a temperature detector, a pressure detector, and a humidity detector to detect and control a humidity at the cathode of one or more of the cells in the fuel cell.

Embodiments of the present disclosure may solve one or more of the problems set forth above and/or other problems in the art. The scope of the current disclosure, however, is defined by the attached claims, and not by the ability to solve any specific problem.

SUMMARY

In one aspect, a system for detecting a humidity level at a cathode of a fuel cell stack including one or more proton exchange membrane fuel cells and determining a flooding probability of the fuel cell stack based on the humidity level, includes a fuel cell stack including a plurality of proton exchange membrane fuel cells, each proton exchange membrane fuel cell including an exhaust; a voltage detector; a humidity detector; and a controller. The controller may be configured to: receive a voltage as measured at an anode of one or more of the proton exchange membrane fuel cells with the voltage detector; determine a humidity level at the exhaust of the one or more of the proton exchange membrane fuel cells; and implement one or more actions based on the voltage and the humidity level, the actions including: reduce a load on the proton exchange membrane fuel cell; increase an air flow at a cathode of the one or more proton exchange membrane fuel cells; decrease an inlet humidity at an inlet to the one or more proton exchange membrane fuel cells; or increase a temperature of the one or more proton exchange membrane fuel cells.

In another aspect, an earth moving machine including a system for detecting a humidity level at a cathode of a fuel cell stack including one or more proton exchange membrane fuel cells and determining a flooding probability of the fuel cell stack based on the humidity level, includes a fuel cell stack including a plurality of proton exchange membrane fuel cells, each proton exchange membrane fuel cell including an exhaust; a voltage detector; a humidity detector; and a controller. The controller may be configured to: receive a voltage as measured at an anode of one or more of the proton exchange membrane fuel cells with the voltage detector; determine a humidity level at the exhaust of the one or more of the proton exchange membrane fuel cells; and implement one or more actions based on the voltage and the humidity level, the actions including: reduce a load on the proton exchange membrane fuel cell; increase an air flow at a cathode of the one or more proton exchange membrane fuel cells; decrease an inlet humidity at an inlet to the one or more proton exchange membrane fuel cells; or increase a temperature of the one or more proton exchange membrane fuel cells.

In yet another aspect, a method of reducing a relative humidity within a cathode of a fuel cell stack comprising one or more proton exchange membrane fuel cells, includes: determining a voltage at an anode of one or more of the proton exchange membrane fuel cells with a voltage detector; determining a humidity level at an exhaust of one or more of the one or more of the proton exchange membrane fuel cells; and implementing one or more actions to reduce the relative humidity based on the voltage and the humidity level. The actions may include reducing a load on the proton exchange membrane fuel cell; increasing an air flow at a cathode of the one or more proton exchange membrane fuel cells; decreasing an inlet humidity at an inlet to the one or more proton exchange membrane fuel cells; or increasing a temperature of the one or more proton exchange membrane fuel cells.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value.

Figure 1:
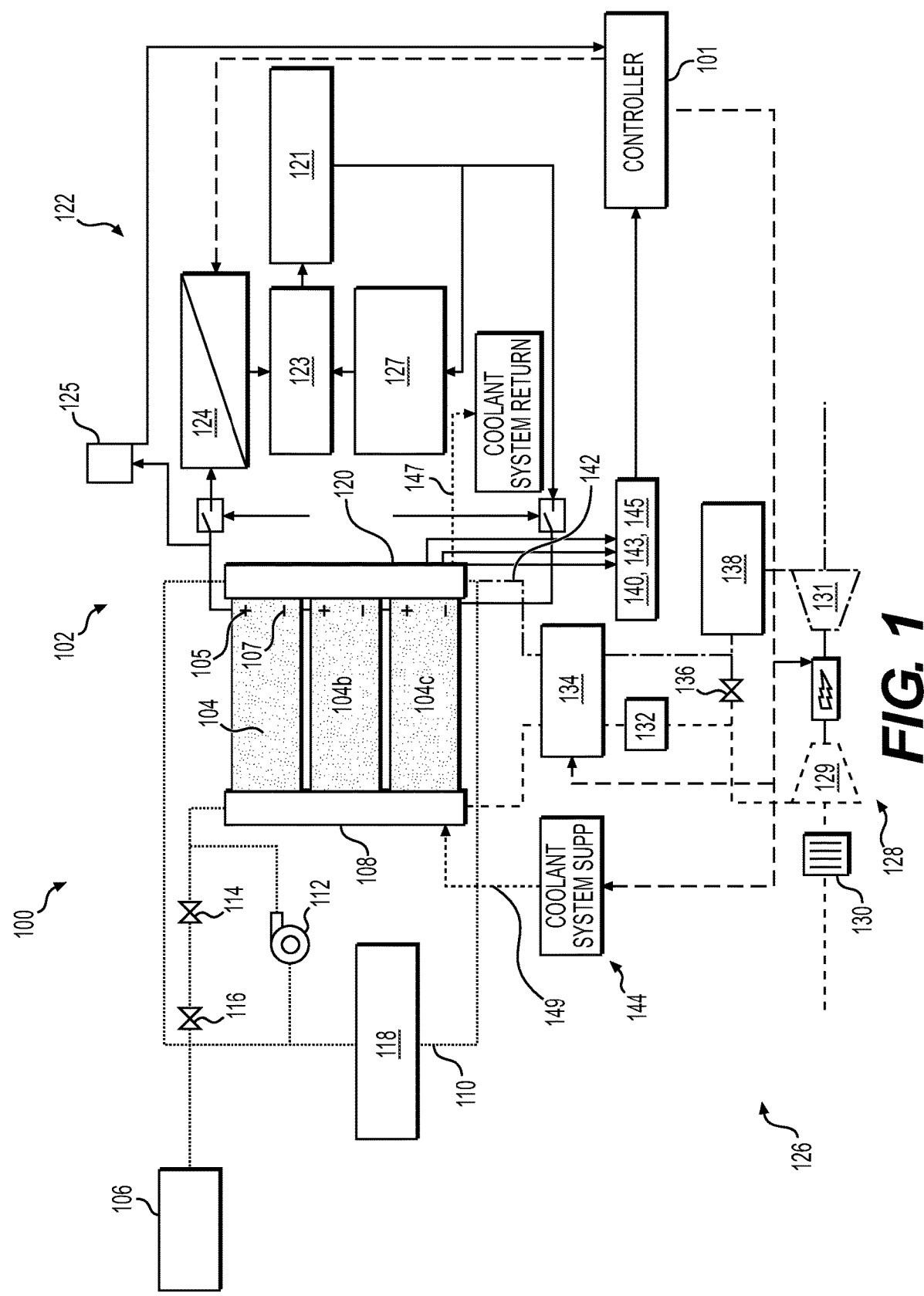
FIG. 1 is a system for reducing a relative humidity at the outlet of a cathode of a proton exchange membrane fuel cell, according to aspects of the disclosure.

FIG. 1 illustrates a system 100 for removing water from a PEMFC stack 102 including a plurality of PEMFCs 104, 104b, 104c. The PEMFcs 104b and 104c may be substantially similar to the PEMFC 104 and details and description in reference to the PEMFC 104 herein may be applicable to the PEMFCs 104b, 104c, etc. The system 100 may further include a controller 101 configured to regulate an electrical power output from the PEMFC stack 102 as will be described in greater detail herein. The controller 101 may be configured to control an electrical distribution system 122, an air management system 126 including a turbocompressor 128, a coolant system 144, and a dehumidifier 134. The controller 101 and the various systems it is configured to control are explained in greater detail herein.

Each of the PEMFCs in the stack 102 receive hydrogen at their anode 105 from a hydrogen supply 106 that is fluidly coupled to an intake manifold 108. The intake manifold 108 may be fluidly coupled to a recirculation line 110 which may include a recirculation pump 112, a pressure regulator 114, and a shutoff 116. The recirculation line 110 may include a moisture separator 118. The PEMFC stack 102 may further include an exhaust manifold 120 for removing water or other liquid from the cathodes 107 of the plurality of PEMFCs 104. The exhaust manifold 120 may fluidly couple to the recirculation line 110 and to an output of the hydrogen supply 106.

The PEMFCs 104 may be electrically coupled to an electrical distribution system 122. The electrical distribution system 122 may be used to power, for example, one or more internal and external loads 121 associated with an earth moving machine (not depicted), another piece of heavy equipment, or other device configured to utilize electrical power. The electrical distribution system 122 may include, for example, a boost converter 124 for boosting a DC voltage, a DC power distribution 123, and a battery 127 (e.g., a lithium iron phosphate (LFP) battery or other type of battery). The controller 101 may be configured to send and/or receive an electrical signal from the boost converter 124 or other component of the electrical distribution system 122 to regulate the electrical output of the PEMFC stack 102. For example, the controller 101 may receive a stack voltage using a voltage detector 125 from the electrical distribution system 122.

Additionally, the system 100 may include the air management system 126 for managing air flow through one or more of the intake manifold 108 and the exhaust manifold 120. The air management system 126 may include the turbocompressor 128. The turbocompressor 128 may be a motor-driven compressor/expander that pressurizes the PEMFC stack 102 with air (e.g., contamination free air) or other fluid and recovers energy from the high-pressure exhaust in the exhaust manifold 120. The turbocompressor 128 may include, for example, a compressor 129, a turbine 131 (which may be a variable nozzle turbine), and motor magnet rotor incorporated onto a common shaft, but other arrangements are possible. The turbocompressor 128 may receive air or other fluid from a fluid supply (not depicted) through a filter 130 and may compress the air or other fluid and deliver it to the stack 102. The filter 130 may counteract cell voltage degradation and possible damage to the MEA by reducing air feed impurities.

The compressor 129 may be configured to provide a flow of oxygen to the stack 102 at the cathode catalyst reaction sites where the electrochemical reduction reaction may occur such that hydrogen protons and electrons combine with oxygen molecules to form water. As it is the hydrogen ions that provide the electrical current necessary to power the system 100, the oxygen requirements (and thus compressor loads) may be dependent on the system electrical demands. The compressor 129 may generally be a parasitic load on the system 100 but may increase efficiency at high loading so as to justify its inclusion in the system 100. The turbine 131 may use expansion to recover energy from the exhaust gases as explained in greater detail herein. The fluid in the exhaust manifold 120 may be used to expand through the turbine 131 and the resulting mechanical energy may be used to increase the overall efficiency of the system 100.

The air management system 126 may further include an air conditioner 132, a dehumidifier 134, an isolation valve 136, and a water separator 138. In some embodiments, an exhaust temperature 140, exhaust pressure 143, and a relative humidity 145 of the cathode exhaust may be measured at an exhaust line 142 from the exhaust manifold 120 to the turbine of the turbocompressor 128. One or more of the sensed exhaust temperature 140, the sensed exhaust pressure 143, and the sensed relative humidity 145 may serve as an input to the controller 101 to affect the power output of the stack 102 as described in greater detail herein.

The dehumidifier 134 may be fluidly coupled to the compressor 129 and the turbine 131 of the turbocompressor 128. The turbine 131 may receive an input from the exhaust line 142 through the dehumidifier 134 such that the humidifier removes moisture from the exhaust fluid before entering the turbine 131 for expansion. The compressor 129 may send compressed fluid through the dehumidifier 134 to the intake manifold 108 to control the flow and humidity of compressed fluid to the PEMFC stack 102. In some embodiments, the controller 101 may be configured to activate the humidifier 134 based on the relative humidity of the exhaust fluid in the exhaust manifold 120 as described in greater detail herein. The water separator 138 may be used to separate a water-fluid mixture (e.g., a water-oil mixture) into multiple component fluids.

Additionally, the system 100 may include a coolant system 144 for providing a flow of coolant to the stack 102. The coolant system 144 may include a coolant supply 149 and a coolant return 147. The coolant supply 149 may be configured to provide a flow of coolant to the intake of the PEMFCs 104. The coolant return 147 may be configured to receive heated coolant from the PEMFCs 104 at the exhaust manifold 120. In some embodiments, the individual PEMFCs 104 within the stack 102 may include cooling channels within one or more of their component parts. For example, the PEMFCs 104 may include coolant channels integrated into their bipolar plates (not shown). The coolant may be, for example, a liquid coolant, such as refrigerant, water, a water-glycol mixture, or another liquid coolant. In some embodiments, the coolant system may include a deionizer (not shown). The coolant system 144 may include one or more pumps for increasing the pressure in a coolant supply of the coolant system 144.

The relative humidity 145 may be measured using any device capable of measuring relative humidity such as, for example, a sling psychrometer, a capacitive hygrometer, a resistive hygrometer, a thermal hygrometer, a gravimetric hygrometer, an optical hygrometer, or other device capable of measuring a humidity. The relative humidity 145 may be measured using one or more sensors at one or more locations. For example, the relative humidity may be measured at an inlet or outlet of the exhaust manifold 120, at the outlets of the channels in the individual PEMFCs 104, at the exhaust line 142 from the exhaust manifold 120 to the turbine 131, or at another location. The relative humidity 145 may serve as an input to the controller 101 as described in greater detail herein.

The exhaust pressure 143 at the cathode exhaust may be measured using one or more of a pressure transducers, pressure transmitters, pressure senders, pressure indicators, piezometers, and manometers to generate exhaust pressure system data as described herein. The exhaust pressure 143 may serve as an input for, among other things, the controller 101 to determine whether to take one or more actions based on the relative humidity at the cathode exhaust as described in greater detail herein.

The exhaust temperature 140 may be measured using one or more temperature detectors, such as, for example, one or more thermocouples, liquid expansion thermometers, resistance temperature detectors, pyrometers, Langmuir probes, infrared sensors, and other devices for measuring temperature to generate exhaust temperature system data as described herein. The exhaust temperature 140 may serve as an input for, among other things, the controller 101 to determine whether to take one or more actions based on the relative humidity at the cathode exhaust as described in greater detail herein. In some embodiments, the plurality of PEMFCs 102 may be configured such that a temperature profile is substantially uniform across the plurality of PEMFCs. That is, the PEMFC stack 102 may be configured such that an individual cell temperature of each of the cells is substantially equivalent to the other cells.

Figure 2:
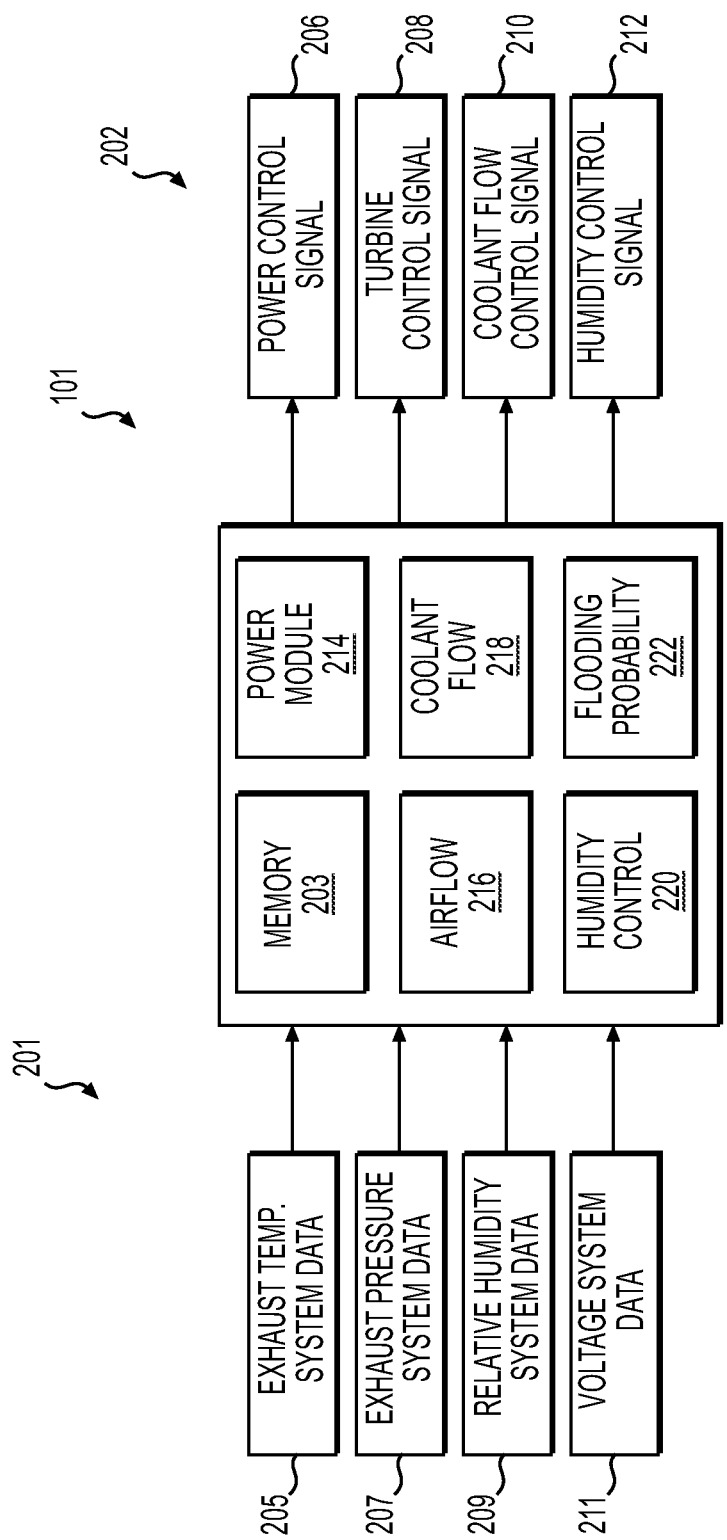
FIG. 2 is a controller for implementing one or more control processes using the system of FIG. 1.

Referring now to FIG. 2, the controller 101 may receive multiple inputs 201 and send various outputs 202 and may include a memory 203. The controller 101 may comprise a data processor, a microcontroller, a microprocessor, a digital signal processor, a logic circuit, a programmable logic array, or one or more other devices for controlling the system 100 in response to one or more of the inputs 201. Controller 101 may embody a single microprocessor or multiple microprocessors that may include one or more features (e.g., hardware and/or software) for automatically reducing a relative humidity in a PEMFC stack exhaust by controlling one or more associated systems. For example, the controller 101 may include a memory, a secondary storage device, and a processor, such as a central processing unit or any other means for accomplishing a task consistent with the present disclosure. The memory or secondary storage device associated with controller 101 may store data and/or software routines that may assist the controller 101 in performing its functions, such as the functions of the exemplary control process 300 described in FIG. 3. Further, the memory or secondary storage device associated with the controller 101 may also store data received from various inputs associated with the system 100. Numerous commercially available microprocessors can be configured to perform the functions of the controller 101. It should be appreciated that controller 101 could readily embody a general machine controller capable of controlling numerous other machine functions. Alternatively, a special-purpose machine controller could be provided. Further, the controller 101, or portions thereof, may be located remote from the system 100. Various other known circuits may be associated with the controller 101, including signal-conditioning circuitry, communication circuitry, hydraulic or other actuation circuitry, and other appropriate circuitry.

The memory 203 may store software-based components to perform various processes and techniques described herein of the controller 101. The memory 203 may store one or more machine readable and executable software instructions, software code, or executable computer programs, which may be executed by a processor of the controller 101. The software instructions may be further embodied in one or more routines, subroutines, or modules and may utilize various auxiliary libraries and input/output functions to communicate with other equipment, modules, or aspects of the system 100. In some embodiments, the memory 203 may include exhaust system temperature data, exhaust pressure system data, exhaust relative humidity system data, or voltage system data which may be used to enact one or more of the steps of the control process 300 described herein or another control process.

The inputs 201 to the controller 101 may include, among other things, exhaust temperature system data 205, exhaust pressure system data 207, relative humidity system data 209, and voltage system data 211. The system data may be measured or sensed at various components in the system 100. For example, the exhaust temperature system data 205 may come from a temperature of the cathode exhaust as measured at the exhaust temperature 140. The exhaust pressure system data 207 may be measured as exhaust pressure 143, and the relative humidity system data 209 may be measured as cathode relative exhaust humidity 145. The voltage system data 211 may be based on, for example, a signal from the voltage detector 125. Each of the inputs 201 may serve to help regulate the relative humidity at the cathode exhaust by generating the controller output signals as described in greater detail herein. The outputs 202 from the controller 101 may include a power control signal 206, a turbine signal 208, a coolant flow control signal 210, and a humidity control signal 212. The power control signal 206, turbine signal 208, coolant flow control signal 210, and humidity control signal 212 may be generated in a power module 214, an air flow module 216, a coolant flow module 218, and a humidity control module 220, respectively. Additionally, the controller 101 may include a flooding probability module 222 for calculating a probability of flooding at the cathode 105 of the PEMFC stack 102 as described in greater detail herein.

The power control signal 206 may control one or more components within the electrical distribution system 122. For example, the power control signal 206 may be configured to change one or more settings within the boost converter 124 to reduce the voltage applied from the PEMFC stack 102. The turbine signal 208 may be configured to control air flow to the intake manifold 108 by controlling operation of the turbocompressor 128. The coolant flow control signal 210 may be configured to control a speed, pressure, and/or volumetric or mass flow rate of coolant in the coolant supply system 122 for example, by increasing the speed of the pumps at the coolant supply. The humidity control signal 212 may be configured to control the operation of the humidifier 134 in order to control a humidity at the exhaust manifold 120, thus controlling a relative humidity at the cathode exhaust and decreasing the power reduction of the stack 102 due to cathode flooding.

INDUSTRIAL APPLICABILITY

The disclosed aspects of the system 100 of the present disclosure may be used to control the relative humidity at the exhaust manifold 120 or the cathode of the PEMFC stack 102. Controlling the relative humidity may be beneficial to operation of the system because, as described herein, the capacity for electrical power output of the PEMFC stack 102 may decrease with increasing current density based on flooding at the cathode(s) of the PEMFCs 104.

Figure 3:
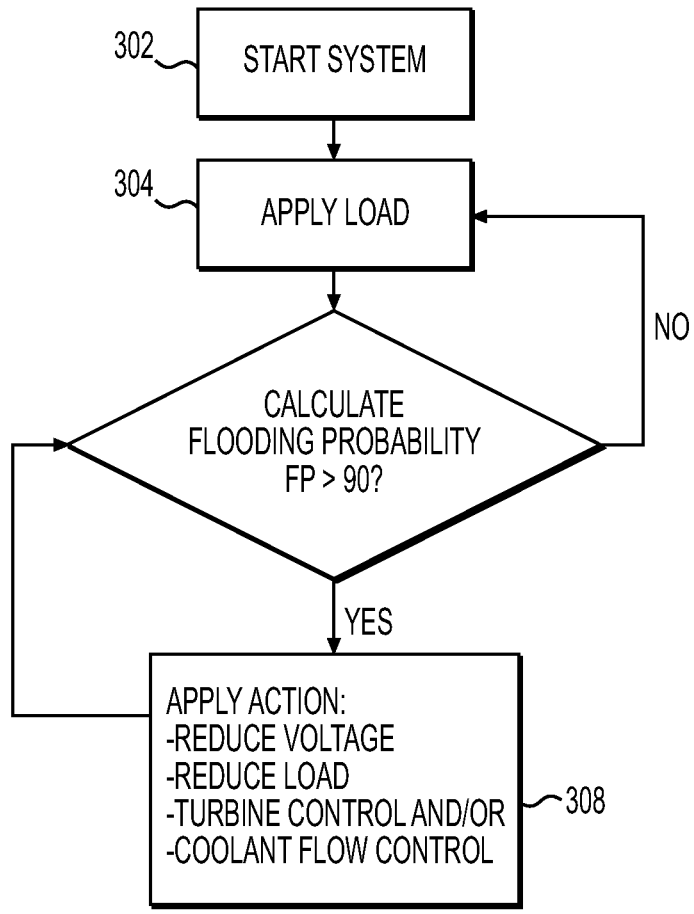
FIG. 3 provides a flowchart depicting an exemplary method for controlling a relative humidity at one or more components of the system of FIG. 1.

Referring to FIG. 3, an exemplary control process 300 for controlling the relative humidity at the cathode of the PEMFC stack 102 of FIG. 1 is shown. The exemplary control process 300 could be implemented using, for example, a controller such as the controller 101 of FIGS. 1 and 2 receiving the inputs 201 and generating the outputs 202 shown in FIG. 2.

At step 302, the system 100 may be started. The system 100 may be a PEMFC stack that is used to power a mobile machine or other heavy equipment (e.g., an earth moving machine, etc.) The mobile machine may be manually operated or have varying levels of autonomy and the mobile machine may be started manually or automatically. Once the mobile machine is started, the system 100 will begin to supply hydrogen to the anode 105 of the PEMFC stack 102 and oxygen (e.g., in air) to the cathode 107.

At step 304, the load on the system 100 may be increased. For example, a demand on the system 100 may be increased by increasing the speed of the mobile machine or, for example, increasing the amount of substance moved with the mobile machine (e.g., excavating more earth) or taking some other action to increase the load of the mobile machine or system 100. As the load increases the amount of water generated at the cathode increases for reasons explained herein.

At step 306, the controller may calculate a probability of flooding (FP). The flooding probability may be based on the inputs to the controller 101. Specifically, the flooding probability may be based on the exhaust temperature system data 205, the exhaust pressure system data 207, the exhaust relative humidity system data 209, and the voltage system data 211. The flooding probability may be calculated in the flooding probability module 222. To calculate the probability of flooding, the controller 101 may determine the water saturation within the cathode exhaust based on one or more of the temperature at the cathode exhaust and the pressure at the cathode exhaust. Additionally, the controller 101 may determine the water saturation directly by measuring the relative humidity at the cathode exhaust. The water saturation may correspond to the extent of flooding. In general, as relative humidity at the cathode approaches 100% (i.e., saturation conditions), decreases in temperature and pressure at the cathode may cause the water vapor at the cathode to condense, flooding the cathode. Accordingly, the controller may take one or more actions to increase the temperature and/or pressure at the cathode 105 in response to a relative humidity above 90% to prevent cathode flooding.

Figure 4:
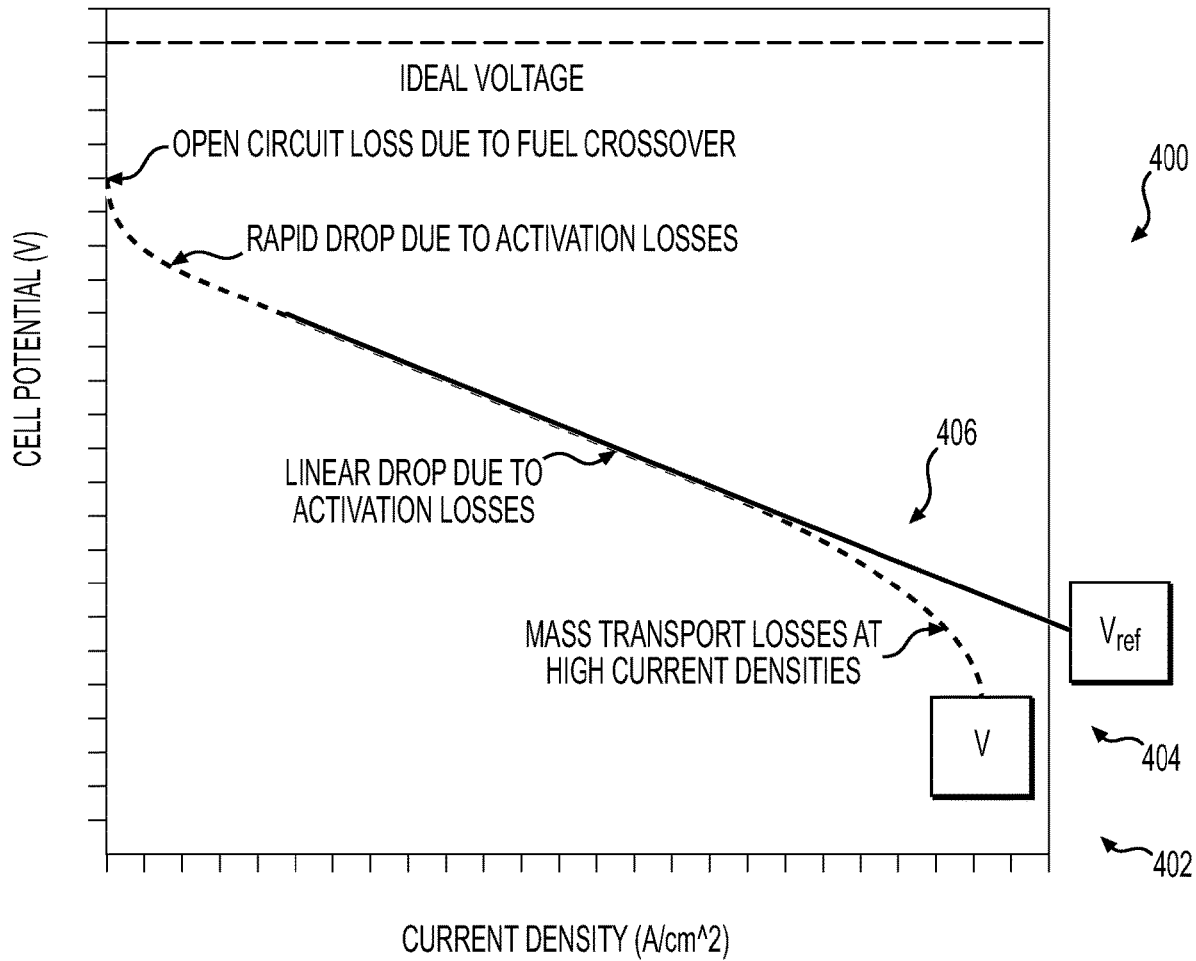
FIG. 4 provides a chart showing a drop in voltage for a proton exchange membrane fuel cell stack, such as the system including proton exchange membrane fuel cells of FIG. 1.

As discussed otherwise herein, flooding in a PEMFC may occur at high current densities when the generation rate of by-product water exceeds the removal rate of residual water from the cell. Flooding can be detected using one or more of the systems described herein (e.g., directly sensing the humidity and other aspects of the air at the cathode exhaust) or by monitoring electrical characteristics of the membrane (e.g., ohmic resistance). FIG. 4 shows a chart 400 including an actual voltage 402 and a reference voltage 404. The actual voltage 402 and reference voltage are plotted on a chart showing cell potential (V) for a given PEMFC v. current density ($A/cm^2$). A sudden drop in the actual voltage 402 of the cell may be a sign of flooding in PEMFC. Blockage by residual water of the access of reactant gases to the catalyst sites means the electrochemical reaction of the cell will stop. A sharp voltage decline (e.g., large delta between actual voltage 402 and reference voltage 404) may occur at a limiting current density of the cell, this limiting current density may be referred to as a cut-off current density 406. The various systems and methods for removing water from the cathode of the PEMFC discussed herein may help increase the value of the cutoff voltage.

The flooding probability calculation may be based on, for example, an input of one or more of exhaust temperature system data 205, exhaust pressure system data 207, relative humidity system data 209, and voltage system data 211.

At step 308, the controller may take an action in response to the potential cathode flooding. For example, the controller 101 may reduce a voltage at the electrical distribution system 122 in order to reduce the rate of the chemical reaction within the PEMFCs 104 based on a high system voltage as measured with the voltage system data 215. The controller 101 may receive a voltage as measured at an anode 105 of one or more of the proton exchange membrane fuel cells with the voltage detector 125. The voltage may be measured at one or more of the anodes 105 of the various PEMFCs 104 in the stack 102. While the particular arrangement shown in FIG. 1 shows the voltage being measured at the output of the stack 102, embodiments are not limited to this arrangement, and system voltage could be measured at various locations within the electrical distribution system 122 and this voltage could be used as an input to the controller 101. For example, the voltage may be measured at an output of the boost converter 124 or at other locations of the electrical distribution system 122.

Additionally, the controller 101 may cause the system 100 to reduce a load on the PEMFC stack 102 based on an input of one or more of exhaust temperature system data 205, exhaust pressure system data 207, relative humidity system data 209, and voltage system data 211. The controller 101 may, for example, send a control signal (e.g., the power control signal 206) to the DC/DC converter 124 to reduce an output voltage at the output of the DC/DC converter 124. In other embodiments, the controller 101 may send a control signal to the DC power distribution 123 to secure power supply to one or more loads or may send a control signal to the internal and external loads 121 directly to secure one or more of the internal and external loads.

Additionally, the controller 101 may send a turbine control signal 208 to the turbocompressor 128 based on an input of one or more of exhaust temperature system data 205, exhaust pressure system data 207, relative humidity system data 209, and voltage system data 211. The turbine signal 208 may cause the turbocompressor 128 to change speeds (thus changing the speed of both the compressor 129 and the turbine 131, which may be on a common shaft), to change a geometry of the turbine (e.g., change the nozzle throat area), and/or make one or more other changes to the operation of the turbocompressor 128 to increase air flow through the exhaust manifold 120 or the cathode exhaust of the PEMFCs 104. In some embodiments, the cathode air flow control signal 208 may change the back pressure in the exhaust manifold 120 from the turbine 131, thus changing fuel cell operating pressure. The compressor 129 may be configured to send compressed air or other gas to one or more of the intake manifold 108 and the exhaust manifold 120 of the PEMFC stack 102 to change the pressure within the stack 102. Changing the operating pressure within the stack 102 may increase the saturation pressure within the cathode exhaust, reducing the probability of flooding, as described herein. Additionally, increasing the air flow may remove saturated or humid air from the stack 102. With higher gas mass flow, the oxygen partial pressure may increase at the cathode 107 of the stack 102 increasing the voltage of the stack 102, especially at higher power outputs. Additionally, because a significant portion of the cathode exhaust flow is water vapor, the turbine 131 may increase efficiency of the system through energy recovery as the turbocompressor 128 operates, which may partially account for the added energy consumption of operating the compressor 129.

Additionally, in response to an increased load condition in which the system 100 calculates a flooding probability of greater than 90% based on an input of one or more of exhaust temperature system data 205, exhaust pressure system data 207, relative humidity system data 209, and voltage system data 211, the controller may generate the coolant flow control signal 210. The coolant flow control signal 210 may travel from the controller 101 to one or more components of the cooling system 144 causing an increased mass or volumetric flow rate of coolant to the cooling channels in the PEMFCs 104. The increased coolant flow may reduce cell temperatures by absorbing the latent heat of vaporization of the water in the cathode exhaust channels, condensing the water in the PEMFC cathode channels more quickly and reducing back pressure within the channel, thereby increasing the flow of protons across the MEA and increasing cell electrical power output.

In some embodiments, the system 100 may include the dehumidifier 134 and the dehumidifier may be used to control the humidity levels at the cathode exhaust 120 using a humidity control signal 212. The humidity control signal 212 may be generated in the controller 101 and may be used to dehumidify the PEMFC cathode by removing fluid at the cathode exhaust line 142. In some embodiments, the dehumidifier 134 may be operable to increase the humidity levels (i.e., act as a humidifier) in order to keep the fuel cell stack at the proper level of moisture in the case of overly dry fuel cells. The dehumidifier 134 may operate based on a signal from the controller 101 or other signal and may remove moisture from air at the PEMFC exhaust or add moisture to, for example, air at an exhaust of the compressor 129.

It should now be understood that measuring and controlling the relative humidity at a cathode exhaust can be advantageous to proper operation of a PEMFC stack. By controlling one or more of a power output of a PEMFC stack, an airflow to the exhaust of the PEMFC stack, a coolant flow to coolant channels within the fuel cell stack, and a humidity at the exhaust of the one or more cells, a system can reduce a voltage drop that is generally otherwise seen as current densities increase throughout the stack.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A system for detecting a humidity level at a cathode of a fuel cell stack including one or more proton exchange membrane fuel cells and determining a flooding probability of the fuel cell stack based on the humidity level, the system comprising:
a fuel cell stack including a plurality of proton exchange membrane fuel cells, each proton exchange membrane fuel cell including an exhaust;
a voltage detector;
a humidity detector; and
a controller configured to:
receive a voltage as measured at an anode of one or more of the proton exchange membrane fuel cells with the voltage detector;
determine a humidity level at the exhaust of the one or more of the proton exchange membrane fuel cells; and
implement one or more actions based on the voltage and the humidity level, the actions including:
reduce a load on the proton exchange membrane fuel cell;
increase an air flow at a cathode of the one or more proton exchange membrane fuel cells;
decrease an inlet humidity at an inlet to the one or more proton exchange membrane fuel cells; or
increase a temperature of the one or more proton exchange membrane fuel cells.

2. The system of claim 1, further comprising:
a coolant supply system configured to supply a coolant to cool one or more of the one or more proton exchange membrane fuel cells and wherein:
the controller is further configured to decrease a flow of the coolant to the one or more proton exchange membrane fuel cells.

3. The system of claim 1, further comprising:
a pressurized fluid supply system configured to supply a pressurized fluid to one or more of the proton exchange membrane fuel cells to reduce a humidity of one or more proton exchange membrane fuel cells.

4. The system of claim 3, wherein the pressurized fluid is air.

5. The system of claim 3, wherein the pressurized fluid supply system comprises a turbocompressor.

6. The system of claim 1, wherein the exhaust of each of the proton exchange membrane fuel cells is fluidly coupled in an exhaust manifold and the humidity is determined from the exhaust manifold.

7. The system of claim 1, wherein the inlet to the one or more proton exchange membrane fuel cells is fluidly coupled to a dehumidifier, and the dehumidifier is configured to reduce the humidity level of fluid entering the one or more proton exchange membrane fuel cells.

8. The system of claim 7, wherein the dehumidifier is configured to receive and dehumidify a pressurized fluid and supply the pressurized fluid to the inlet of the one or more proton exchange membrane fuel cells.

9. The system of claim 1, wherein the one or more proton exchange membrane fuel cells are configured such that a temperature profile across the fuel cell stack is substantially uniform.

10. An earth moving machine including a system for detecting a humidity level at a cathode of a fuel cell stack including one or more proton exchange membrane fuel cells and determining a flooding probability of the fuel cell stack based on the humidity level, the system comprising:
   a fuel cell stack including a plurality of proton exchange membrane fuel cells, each proton exchange membrane fuel cell including an exhaust;
   a voltage detector;
   a humidity detector; and
   a controller configured to:
      receive a voltage as measured at an anode of one or more of the proton exchange membrane fuel cells with the voltage detector;
      determine a humidity level at the exhaust of the one or more of the proton exchange membrane fuel cells; and
      implement one or more actions based on the voltage and the humidity level, the actions including:
         reduce a load on the proton exchange membrane fuel cell;
         increase an air flow at a cathode of the one or more proton exchange membrane fuel cells;
         decrease an inlet humidity at an inlet to the one or more proton exchange membrane fuel cells; or
         increase a temperature of the one or more proton exchange membrane fuel cells.

11. The earth moving machine of claim 10, further comprising:
   a coolant supply system configured to supply a coolant to cool one or more of the one or more proton exchange membrane fuel cells and wherein:
   the controller is further configured to decrease a flow of the coolant to the one or more proton exchange membrane fuel cells.

12. The earth moving machine of claim 10, further comprising:
   a pressurized fluid supply system configured to supply a pressurized fluid to one or more of the proton exchange membrane fuel cells to reduce a humidity of one or more proton exchange membrane fuel cells.

13. The earth moving machine of claim 12, wherein the pressurized fluid is air.

14. The earth moving machine of claim 12, wherein the pressurized fluid supply system comprises a turbocompressor.

15. The earth moving machine of claim 10, wherein the exhaust of each of the proton exchange membrane fuel cells is fluidly coupled in an exhaust manifold and the humidity is determined from the exhaust manifold.

16. The earth moving machine of claim 10, wherein the inlet to the one or more proton exchange membrane fuel cells is fluidly coupled to a dehumidifier, and the dehumidifier is configured to reduce the humidity level of fluid entering the one or more proton exchange membrane fuel cells.

17. A method of reducing a relative humidity within a cathode of a fuel cell stack comprising one or more proton exchange membrane fuel cells, the method comprising:
   determining a voltage at an anode of one or more of the proton exchange membrane fuel cells with a voltage detector;
   determining a humidity level at an exhaust of one or more of the one or more of the proton exchange membrane fuel cells; and
   implementing one or more actions to reduce the relative humidity based on the voltage and the humidity level, the actions including:
      reducing a load on the proton exchange membrane fuel cell;
      increasing an air flow at a cathode of the one or more proton exchange membrane fuel cells;
      decreasing an inlet humidity at an inlet to the one or more proton exchange membrane fuel cells; or
      increasing a temperature of the one or more proton exchange membrane fuel cells.

18. The method of claim 17, wherein the relative humidity is determined based on.

19. The method of claim 17, wherein the fuel cell stack comprises an exhaust manifold and a stack temperature is measured at the exhaust manifold.

20. The method of claim 17, wherein the voltage at the anode is used to reduce a DC power distribution in a boost converter.

* * * * *